United States Patent Office 3,394,202
Patented July 23, 1968

3,394,202
ISOMERIZATION PROCESS UTILIZING A SUPPORTED HEXAFLUOROANTIMONIC ACID CATALYST
Jan M. Oelderik, Amsterdam, Netherlands, assignor to Shell Oil Company, New York, N.Y., a corporation of Delaware
No Drawing. Filed June 29, 1965, Ser. No. 468,105
Claims priority, application Netherlands, July 3, 1964, 6407565
11 Claims. (Cl. 260—683.68)

ABSTRACT OF THE DISCLOSURE

An isomerization process utilizes a hexafluoroantimonic acid catalyst supported on a solid carrier which is substantially inert to the acid. The acid catalyst may also be applied as the $RSbF_8$ form in which R is a cycloalkyl radical having from 4 to 12 carbon atoms. Suitable carriers include alumina, aluminum fluoride and fluorinated alumina. The supported catalyst is highly active for any acid-catalyzed hydrocarbon conversions but is relatively noncorrosive and easily applied in commercial operations.

---

This invention relates to a catalyst and process for hydrocarbon conversions. In particular, the invention relates to catalytic conversions of lower molecular weight hydrocarbons with supported hexafluoroantimonic acid catalysts.

Hexafluoroantimonic acid catalysts are extremely active for conversion of hydrocarbons to other hydrocarbons. These catalysts, which are many times more active than conventional acid catalysts such as aluminum chloride and bromide and $HF-BF_3$, have been described in detail in copending application Ser. No. 284,806, filed June 3, 1963, now U.S. Patent No. 3,201,494 issued Aug. 7, 1965. Hexafluoroantimonic acid catalysts have the general formula $RSbF_6$, where R is hydrogen or $C_4-C_{12}$ alkyl or cycloalkyl. The preferred form of the catalyst is $HSbF_6$, and the catalyst may be diluted with, e.g., up to about 20 parts of a diluent such as HF. In general, these catalysts may be used for any acid-catalyzed hydrocarbon conversion, for example isomerization, alkylation, polymerization, cracking, disproportionation, etc. They are particularly desirable for paraffin isomerization, which may be effected at high conversions at low temperatures where equilibrium is favorable.

Although the high activity of hexafluoroantimonic acid catalysts is particularly desirable for purposes of catalysis, their extreme acidity creates certain difficulties which require special precautions on technical applications. These catalysts are liquids which are difficult to handle, and are extremely corrosive, requiring expensive equipment. When used in lqiuid form, only very resistant materials of construction may be used; suitable materials are for example aluminum, nickel, lead, nickel-molybdenum alloys, nickel-tungsten alloys, aluminum-magnesium alloys, polyethylene, polystyrene, polytrichlorofluoroethylene (Kel-F), polytetrafluoroethylene (Teflon, Hostaflon, Fluon), modified halide polymers (Tygon), etc. In general, these materials are often costly or difficult to fabricate.

It has now been discovered that many of the operating difficulties associated with the use of hexafluoroantimonic acid catalysts are obviated by supporting the acid on a solid carrier which is inert to the acid. The term "inert" as applied to support materials in this context means that the carrier material does not substantially react with the hexafluoroantimonic acid catalyst. Under conditions of the hydrocarbon conversion reaction, not more than 0.1% per hour and preferably less than 0.01% per hour of the active catalyst material present on the carrier should be rendered inactive by reaction with the carrier. The supported catalysts of the invention are substantially non-corrosive; this surprising advantage allows the use of normal materials of construction (i.e., ferrous metals) to be used in commercial installations.

Any solid material which is inert to hexofluoroantimonic acid and substantially insoluble under reaction conditions may be used to support the acid. These materials include metals, alloys, synthetic polymers, and salts. Suitable metals are platinum and aluminum; suitable alloys are platinum-gold alloys, nickel-molybdenum alloys (Hastelloy B), nickel-tungsten alloys (Hastelloy C), and aluminum-magnesium alloys. Synthetic materials useful as supports include polyethylene, polytrifluorochloroethylene, polytetrafluoroethylene, modified halide polymers, copolymers of tetrafluoroethylene and hexafluoropropylene, etc. Suitable salts for support material include antimony trifluoride and aluminum trifluoride.

In addition to the inert support materials mentioned above, suitable inert carriers may be prepared from solids which are not inert but which have been treated to make them inert, e.g., coated with a thin layer of inert material. This embodiment of the invention may be preferred in many cases, since it is usually desirable to support the acid on a carrier having a high surface area for maximum contact area with hydrocarbons to be converted. Most naturally inert materials, such as those listed above, would require additional treatment to produce a porous structure with a high surface area; in general, it is more expedient to apply an inert material to the surface of a naturally porous solid. Examples of materials having a high surface area which may be treated to provide supports of the invention are alumina, silica, silica-alumina, magnesia, chromia, boria, zirconia, and mixtures and combinations thereof, as well as other metal oxides, natural and synthetic zeolites, such as zeolites X, Y, mordenite, erionite, etc. Other natural materials, such as bauxite, kieselguhr, kaolin, bentonite, diatomaceous earth, optionally acid-treated, are also useful as support materials after passivation with an inert material. Although the specific surface area of the porous carrier is slightly decreased as a result of the treatment, inert carriers with a specific surface area of at least 100 m.$^2$/gm. are easily prepared. Desirable surface areas are from 10 to about 500 m.$^2$/gm., preferably 20 to 200 m.$^2$/gm., with pore diameters greater than 10 A. and preferably 100–1000 A. Preferred materials are alumina or alumina-containing, because if the coating layer of inert material is not continuous, inert aluminum fluoride will be formed at the spots which have not been coated upon contact with hexafluoroantimonic acid. In other words, when alumina-containing materials are used, any exposed alumina surviving the passivation step will become deactivated by reaction of the alumina with hexafluoroantimonic acid to produce aluminum fluoride.

Passivation of the porous solid may be effected by contact with the liquid inert material neat or dissolved in a solvent, or by contact with gaseous inert material. The starting material is adjusted to the desired particle size by sieving or grinding, and may be soaked in, e.g., an aqueous solution of aluminum fluoride and HF. The liquid is then removed by evaporation, leaving behind a thin layer of aluminum fluoride on the surface, and rendering the solid inert to hexafluoroantimonic acid. The treatment may be repeated to insure that the coating layer is of adequate thickness.

Alternatively, an alumina-containing carrier may be treated with either gaseous or aqueous HF to coat the surface with aluminum fluoride. Or, a porous solid may be treated with a solution of antimony trifluoride in a solvent such as methanol.

Finished catalysts are obtained by treating the inert solids with $RSbF_6$, where R is hydrogen or a saturated cyclic hydrocarbon radical having from about 4 to 12 carbons. This treatment may be effected at ordinary conditions (e.g., room temperature and pressure) by contacting the inert carrier with the liquid acid. The acid may be applied as such, or dissolved in liquid HF or other low-viscosity inert diluent such as a halogenated hydrocarbon. The use of a diluent for application is desirable for preventing catalyst decomposition and damage to the carrier surface which might be caused by heat of absorption. The amount of catalyst used for impregnation depends on the structure and specific surface area of the carrier; in general, about 0.1 to about 20 mg./m.$^2$ of surface is satisfactory. It may be applied by adding an excess of liquid to the solid and subsequently removing excess liquid, or by adding only the desired quantity of acid such that the catalyst retains a dry appearance. Catalyst particle size may vary within wide limits and is determined broadly by the type of process which is used, e.g., fixed, moving, or fluidized bed. In general, fixed bed processes are most useful for, e.g., isomerization reactions in which a close approach to thermodynamic equilibrium is desired, since fixed bed systems avoid "backmixing" which occurs in other processes.

The hexafluoroantimonic acid catalyst may be applied either in the H or R form. In many cases, the initial activity of the $RSbF_6$ form, where R is a saturated cyclic hydrocarbon radical, is greater than that of the $HSbF_6$ form. Preparation of the hydrocarbon form of the acid may take place by any known synthesis, and is most simply effected by mixing $HSbF_6$ with the appropriate hydrocarbon at ambient conditions. Particularly suitable hydrocarbons for this purpose are naphthenes, such as methylcyclopentane, cyclohexane, methylcyclohexane, and their mixtures. This preparation may also be effected in situ, e.g., by passing naphthenes over a supported $HSbF_6$ catalyst. A mixture of H and R forms may also be used.

The supported catalysts of the invention are very active for any acid-catalyzed conversion process, but are particularly effective for isomerization of lower paraffins. Suitable starting materials are normal or slightly branched $C_4$–$C_9$ alkanes, or mixtures such as light naphtha fractions which are available in large quantities in refineries. When commercial streams containing impurities such as dienes, benzene, water, and sulfur compounds, are used, pretreatment for removal of impurities is desirable. Most of these compounds can be removed by a simple hydrogenation, or by pretreating the feed with spent hexafluoroantimonic acid catalyst. Paraffin isomerization with the present catalysts is effected at about $-10°$ to $60°$ C., preferably 10 to $50°$ C. In $C_5$–$C_7$ isomerization, the reaction rate may be increased appreciably by the addition of 5–25% w., isobutane, which does not participate in the reaction. Examples of other conversions which may be carried out with the present catalysts are described in copending application Ser. No. 284,806, discussed above.

Gradual deactivation of the catalyst, which may occur because of presence of impurities in the feed or because of formation of small amounts of polymerization products, may be suppressed by effecting the reaction in the presence of 1–3% m. hydrogen, based on the hydrocarbon feed. This hydrogen may be fed to the reactor as a gas, or may be partially or completely dissolved in the hydrocarbon feed.

The following examples are intended to illustrate the process and catalyst of the invention, but should not be construed to limit its scope.

Example I

Hexafluoroantimonic acid (12.1 parts by weight) was stirred with an excess of methylcyclopentane for ten minutes in order to convert the acid into the R-form ($C_6H_{11}SbF_6$). In this treatment 2.35 pbw. of methylcyclopentane reacted after which the remainder was separated. To form the finished catalyst, 21 pbw. of porous aluminum fluoride (particle size 0.3–0.6 mm.) were impregnated with the methylcyclopentyl hexafluoroantimonate thus obtained. The hexafluoroantimonic acid catalyst, which had a dry appearance, was placed into a tubular reactor of normal carbon steel.

Subsequently, n-pentane containing 3% w. of methylcyclopentane and saturated with hydrogen at a pressure of 10 atm. abs. was passed continuously over the catalyst. The reaction temperature was $25°$ C., and the space velocity was 1 g. of pentane per g. of catalyst per hour. The degree of isomerization attained at several points of the continuous experiment were as follows:

| Experiment hour: | Isopentane content of the pentane fraction of the reaction product, percent w. |
|---|---|
| 1–2 | 75.6 |
| 2–3 | 79.2 |
| 3–4 | 78.2 |
| 4–5 | 78.9 |
| 15–18 | 78.4 |
| 19–22 | 78.8 |

At $25°$ C. the n-pentane/isopentane equilibrium contains 85% w. of isopentane. During the 19th up to and including the 22nd experiment hour the conversion of n-pentane was therefore $$\frac{78.8}{85} \times 100\% = 93\%$$

of the conversion theoretically possible.

Example II

The starting material was an amorphous alumina, suitable for application in a fluidized bed, with a specific surface area of 290 m.$^2$ and an average pore diameter of 70 A. Two hundred parts by weight of this material were soaked with an aqueous HF solution which contained 16 pbw. of HF. The alumina thus treated was then dried for 64 hours at $95°$ C. and subsequently calcined for two hours at $700°$ C.

For the preparation of the catalyst, methylcyclopentylhexafluoroantimonate was synthesized by stirring a mixture of 258 pbw. of antimony pentafluoride and 20 pbw. of anhydrous HF with 200 pbw. of methylcyclopentane for ten minutes. In this treatment 57 pbw. of the methylcyclopentane was taken up in the acid phase; the remaining hydrocarbon phase was removed. To prepare the final catalyst, 150 pbw. of the fluorinated alumina was impregnated with 70 pbw. of the methylcyclopentylhexafluoroantimonate.

The resulting catalyst, which had a dry appearance, was used for isomerization of n-pentane. A stirred-tank reactor was filled with 378 pbw. of an n-pentane fraction that contained 10 pbw. of methylcyclopentane and 200 pbw. of catalyst. The mixture was stirred under a hydrogen pressure of 2 atm. abs. at a temperature of $24°$ C.; the isopentane content of the reaction product was determined at 15 minute intervals. The results in the table below show that the catalyst possesses an excellent activity for isomerization of n-paraffins.

TABLE 1

| | Composition of $C_5$ Fraction, Percent W. | |
|---|---|---|
| Time, minutes: | n-$C_5$ | i-$C_5$ |
| 0 | 100 | 0 |
| 15 | 79.1 | 20.9 |
| 30 | 64.3 | 35.7 |
| 45 | 52.2 | 47.5 |
| 60 | 43.6 | 56.4 |

Example III

Commercial alumina (20 pbw.) with a particle size between 0.3 and 0.6 mm., a specific surface area of 180 m.$^2$ per g. and an average pore diameter of 140 A., was calcined for two hours at 700° C., and soaked with a solution of 30 pbw. of antimony trifluoride in methanol. The impregnated alumina was then dried under vacuum for three hours at 100° C. A thin layer of inert antimony trifluoride was formed on the alumina, which was subsequently impregnated with 16.7 pbw. of methylcyclopentyl hexafluoroantimonate. The catalyst thus obtained, which had a dry appearance, showed an activity for the isomerization of n-pentane similar to that of the catalyst of Example II.

Example IV

Commercial alumina (15 pbw.) with a particle size of 0.3–0.6 mm., a specific surface area of 180 m.$^2$ per g. and an average pore diameter of 140 A., was calcined for two hours at 700° C., and impregnated at room temperature with an aqueous aluminum fluoride solution. This solution had been prepared by reacting 1.1 pbw. of aluminum foil chips (99.9% pure) with a slight excess of 15% aqueous HF solution. The impregnated alumina was dried under vacuum for two hours at 100° C. and calcined for two hours at 700° C. The inert carrier, which now had a specific surface area of 120 m.$^2$ per gram and a pore volume of 0.39 ml. per gram, was finally impregnated with 16.1 pbw. of methylcyclopentyl hexafluoroantimonate. The resulting catalyst, which had a dry appearance, showed an activity for the isomerization of n-pentane similar to that of the catalyst according to Example II.

I claim as my invention:

1. A process for catalytic conversion of hydrocarbons which comprises contacting the hydrocarbons to be converted with a hexafluoroantimonic acid catalyst supported on a solid carrier which is substantially inert to the supported acid.

2. The process of claim 1 wherein the hexafluoroantimonic acid catalyst has the formula $RSbF_6$, R being hydrogen or a cycloalkyl radical having 4 to 12 carbons.

3. A process for catalytic conversion of hydrocarbons which comprises contacting the hydrocarbons in the liquid phase with a solid catalyst comprising hexafluoroantimonic acid supported on a porous solid carrier having a surface substantially inert to the hexafluoroantimonic acid.

4. A process for isomerization of hydrocarbons having from 4 to 7 carbons which comprises contacting the hydrocarbons under isomerization conditions with a hexafluoroantimonic acid catalyst supported on a solid carrier which is substantially inert to the supported acid.

5. A process for isomerization of hydrocarbons having from 4 to 7 carbons which comprises contacting the hydrocarbons in the liquid phase under isomerization conditions with a hexafluoroantimonic acid catalyst supported on a porous solid carrier which is substantially inert to the supported acid.

6. The process of claim 5 wherein the solid catalyst has a surface area of 20 to 200 m.$^2$/gm.

7. A catalyst comprising a solid support having a surface which is inert to $HSbF_6$ having substantially uniformly distributed thereon a hexafluoroantimonic acid catalyst of the formula $RSbF_6$ where R is hydrogen or a cycloalkyl radical having from 4 to 12 carbons.

8. A catalyst having a surface area of from 10 to 500 m.$^2$/gm. which comprises a porous solid support having a surface which is inert to $HSbF_6$ on which is distributed a hexafluoroantimonic acid catalyst of the formula $RSbF_6$ where R is hydrogen or a cycloalkyl radical having from 4 to 12 carbons.

9. The catalyst of claim 8 wherein the catalyst has a surface area of 20 to 200 m.$^2$/gm. and a pore diameter greater than 10 A.

10. A catalyst having a surface area of 10 to 500 m.$^2$/gm. and a pore diameter greater than 10 A, which comprises a porous solid support having a substantially inert surface on which is distributed from 0.1 to 20 mg./m.$^2$ surface area of $RSbF_6$, wherein R is hydrogen or a cycloalkyl radical having from 4 to 12 carbons.

11. The catalyst of claim 10 wherein the solid support comprises alumina.

References Cited

UNITED STATES PATENTS

| | | | |
|---|---|---|---|
| 2,250,410 | 6/1941 | Van Peski | 260—683.68 |
| 2,271,043 | 1/1942 | Van Peski | 260—683.68 |
| 2,431,715 | 12/1947 | Wachter | 260—683.51 |
| 3,156,737 | 11/1964 | Gutberlet | 260—683.65 |
| 3,201,494 | 8/1965 | Oelderik et al. | 260—683.68 |
| 3,239,450 | 3/1966 | Lindquist | 252—441 |

FOREIGN PATENTS 1,001,767  8/1965  Great Britain.

DELBERT E. GANTZ, *Primary Examiner.*

GEORGE J. CRASANAKIS, *Assistant Examiner.*